United States Patent
Ingebrigtsen et al.

[11] Patent Number: 5,983,931
[45] Date of Patent: Nov. 16, 1999

[54] ROTATING CONNECTOR WITH INTEGRATED LNG COURSE

[75] Inventors: Atle B. Ingebrigtsen, Nesttun; Jens R. Odegaard, Os, both of Norway

[73] Assignee: Den Norske Stats Oljeselskap A.S., Stavanger, Norway

[21] Appl. No.: 08/981,514

[22] PCT Filed: Jun. 19, 1996

[86] PCT No.: PCT/NO96/00149

§ 371 Date: Mar. 19, 1998

§ 102(e) Date: Mar. 19, 1998

[87] PCT Pub. No.: WO97/00805

PCT Pub. Date: Jan. 9, 1997

[30] Foreign Application Priority Data

Jun. 22, 1995 [NO] Norway .................................... 952512

[51] Int. Cl.$^6$ .................................................. B63B 22/26
[52] U.S. Cl. ........................... 137/580; 137/236.1; 441/5
[58] Field of Search ................. 137/580, 236.1; 411/5

[56] References Cited

U.S. PATENT DOCUMENTS

| | | | |
|---|---|---|---|
| 2,308,137 | 1/1943 | White | 137/580 |
| 2,894,268 | 7/1959 | Griebe | 137/236.1 X |
| 3,082,440 | 3/1963 | Rhedin | 441/5 |
| 3,503,443 | 3/1970 | Blanding et al. | 137/236.1 X |
| 3,756,293 | 9/1973 | Adler et al. | 141/388 |
| 3,894,567 | 7/1975 | Mott et al. | 141/388 |
| 3,913,157 | 10/1975 | Versluis et al. | 441/5 |
| 3,945,066 | 3/1976 | Davies | 441/5 |
| 3,969,781 | 7/1976 | Reid, Jr. | 441/5 |
| 4,081,872 | 4/1978 | Pedersen et al. | 441/5 |
| 4,444,218 | 4/1984 | Baugh | 137/236.1 |
| 4,501,525 | 2/1985 | Grundy et al. | 137/236.1 X |
| 4,602,586 | 7/1986 | Ortloff | 441/5 X |
| 4,683,912 | 8/1987 | Dubrosky | 137/580 |
| 4,921,010 | 5/1990 | Spirer | 137/580 |
| 5,188,146 | 2/1993 | Cook, Jr. et al. | 137/580 |
| 5,288,253 | 2/1994 | Urdshals et al. | 441/5 |
| 5,462,083 | 10/1995 | Kaspar | 137/580 |
| 5,797,413 | 8/1998 | Pollack | 137/580 X |

*Primary Examiner*—John Rivell
*Attorney, Agent, or Firm*—Kane, Dalsimer, Sullivan & Levy, LLP

[57] ABSTRACT

A rotating connector comprising a swivel device (5, 6) having a number of fluid courses (16) for interconnecting a buoy (1) and a pipe system on a floating vessel for production of hydrocarbons, wherein the swivel device comprises a female member (5) and a male member (6) which may be introduced axially into or withdrawn from each other, the female member (5) being permanently fixed to a bottom-anchored centre member of the buoy. One of the fluid courses is arranged for transferring liquefied natural gas (LNG) between the vessel and the transfer line (13) through the buoy, and for this purpose is thermally and physically separated from the other courses. The LNG course is a pipe course or an annular course (43) in a separate unit (40) placed centrally within or surrounding the male swivel member (6), the unit comprising an insulating cofferdam having an annulus (45) for insulation between the LNG course (43) and the male swivel member (6), and an additional annulus (47) for insulation between the LNG course (43) and the female swivel member (5) when the unit (40) surrounds the male swivel member (6). The annulus or annuluses (45, 47) is/are open towards the surroundings via a peripheral annular opening (52, 53) which in operation is sealed against the surroundings by seals (54, 55) for control of a possible LNG leakage via LNG seals (51) between the LNG course (43) and its connection with the transfer line through the buoy.

13 Claims, 5 Drawing Sheets

ROTATING CONNECTOR WITH INTEGRATED LNG COURSE

The invention relates to a rotating connector comprising a swivel device with a number of fluid courses for interconnection between a buoy and a pipe system on a floating vessel for the production of hydrocarbons, wherein the swivel device comprises a female member and a male member which may be introduced axially into or withdrawn from each other, the female member being permanently fixed to a bottom-anchored centre member of the buoy.

A rotating connector of the above-mentioned type is, for example, known from Norwegian patent application No. 932460. This application describes a system for offshore production of hydrocarbons by means of a vessel which is arranged for quick connection and disconnection from a submerged buoy, wherein the buoy is of the type comprising a bottom-anchored centre member which is connected to a number of risers extending up to the buoy, and an outer buoyancy member which is rotatably mounted on the centre member and may be introduced and locked in a submerged downwardly open receiving space in the vessel. At the upper end of the buoy there is arranged a rotating connector or swivel device of the stated type, wherein the swivel members define mutually sealed annular spaces communicating with associated fluid paths in the swivel members, for the transfer of process fluid and possible injection fluids between the risers and a pipe system on the vessel. The female swivel member is permanently fixed to the centre member of the buoy, whereas the male member is connected to an operating means on the vessel, so that the swivel members may be introduced into and withdrawn from each other by the operating means, the swivel members in connected condition defining said annular spaces (annuluses). On each side of the annuluses there are provided sealing means which may be activated by means of a pressure fluid to form a seal between the annuluses, and which may be relieved in case of mutual disconnection of the swivel members. The pressure fluid preferably is a barrier liquid having a higher pressure than the process fluid pressure, so that an overpressure protection against leakage of process fluid is obtained.

On a vessel for offshore production of hydrocarbons it is also of interest to produce liquefied natural gas, abbreviated designated LNG (Liquefied Natural Gas). The liquefied natural gas then is transferred from storage tanks on the production vessel to an LNG tanker, e.g. a so-called shuttle tanker, to be transported to a place of destination. Traditionally, the LNG gas has been transferred to the LNG tanker via a loading hose which is laid out on the sea between the vessels and of which the ends are coupled to coupling heads arranged for this purpose on the deck of the vessels. This loading method is relatively weather sensitive and thus restricted to be carried out under relatively calm weather conditions.

With the recent development of the so-called STL and STP systems, i.e. loading/unloading (STL=Submerged Turret Loading) of hydrocarbons and production (STP=Submerged Turret Production) of hydrocarbons by the use of submerged buoys which, in operation, is introduced and secured in a submerged receiving space at the bottom of a vessel, there have been opened possibilities for the transfer of LNG via submerged buoys and the associated rotating connectors, with the advantages involved thereby with respect to reliable and secure transfer in nearly all weathers.

However, such a transfer of LNG involves large structural challenges, especially as regards sealing structures and insulation conditions, since temperature differences of up to 300° C. may occur between the LNG and crude oil course through the rotating connector. Liquefied natural gas has a temperature of −165° C., and the topical gas pressure in this connection may for example amount to 50 bars, and these factors entails that special considerations must be taken as regards choice of material and choice of sealing material and sealing types.

As regards materials which are suitable for use with such high temperatures, there may for example be used aluminium alloys, titanium alloys, nickel steels (Inconel) or austenitic steel. Austenitic steel in this connection is a satisfactory structural material.

As regards sealing materials and sealing types, metal seals, graphite seals or spring-loaded Teflon seals may be thought to be used. From these, Teflon (PTFE) seals in this connection seem to be the best alternative, under the presupposition that they are constructed so as to be able to absorb the topical thermal and mechanical deformations.

On this background it is an object of the invention to provide a rotating connector in which there is integrated an LNG course which is very well insulated from the remaining part of the device, at the same time as a controllable environment is achieved with respect to LNG leakage and possible contaminations in the sealing environment.

A further object of the invention is to provide such a connector wherein an LNG course is arranged in such a manner that the remaining construction of the device is essentially unfluenced with respect to functions, sealing solutions and choice of material.

For the achievement of the above-mentioned objects there is provided a rotating connector of the introductorily stated type which, according to the invention, is characterized in that one of the fluid courses is arranged for transferring liquefied natural gas (LNG) between the vessel and a transfer line through the buoy, and for this purpose is thermally and physically separated from the other courses, the LNG course being a pipe course or an annular course in a separate unit placed centrally within or surrounding the male swivel member, the unit comprising an insulating cofferdam means having an annulus or insulation between the LNG course and the male swivel member, and an additional annulus for insulation between the LNG course and the female swivel member when the unit surrounds the male swivel member, the annulus or annuluses at least at one end being opened towards the surroundings via a peripheral annular opening which in operation is sealed against the surroundings by sealing means for control of a possible LNG leakage via LNG seals between the LNG course and its connection with the transfer line through the buoy.

As stated above, the LNG unit in the device according to the invention is a separate element which may be oriented either as an annular element outside the male swivel member or as a pipe element centrally therein. This implies that the seals see a small axial travel in a controllable "environment" during a controllable connection. Control of the environment is important when using PTFE seals, since these are somewhat more vulnerable with respect to surface fineness and contaminations than elastomeric seals which are the type of seal which is used in the remaining part of the rotating connector.

By constructing the LNG element in the stated manner, with an insulating cofferdam system with associated sealing means outside the LNG element, a controllable environment with respect to a possible gas leakage is obtained, at the same time as one gets the possibility to put in a very good insulation with maximum area utilization. Thus, the cofferdam means has a dual function, namely firstly that it insulates, and secondly that it controls the LNG seals.

Two ways are of interest for providing insulation in the cofferdam: One way is to provide a vacuum, and the other is to pressurize the cofferdam with an insulating gas, preferably nitrogen ($N_2$), with a pressure which is higher than the LNG pressure.

A vacuum is the best insulator and therefore also requires least space/volume. This solution requires that a small vacuum pump maintains an underpressure in the cofferdam, and that the exhausted gas therefrom goes to burning-off in the flare boom of the vessel. This implies that a possible LNG leakage, which then will go into the cofferdam, will also go to burning-off.

Insulation by means of an $N_2$ overpressure protection (i.e. by a pressure above the LNG pressure) will function in the same manner as the introductorily mentioned overpressure protection used in connection with the sealing means in the remaining part of the rotating connector. With a possible leakage in the LNG seals, $N_2$ will then leak into the LNG course, and with a leakage in the seals towards the surroundings, $N_2$ will leak out into the surroundings (atmosphere/sea). This gives a fairly good insulation, and a simple monitoring of a possible leakage. However, a possible liquid leakage into the cofferdam, for example during interconnection of the male and the female swivel members, will be difficult to remove.

The invention will be further described below in connection with exemplary embodiments with reference to the drawings, wherein.

In the drawings the same reference numerals are used to designate corresponding parts and elements in the different Figures.

Figure 1:
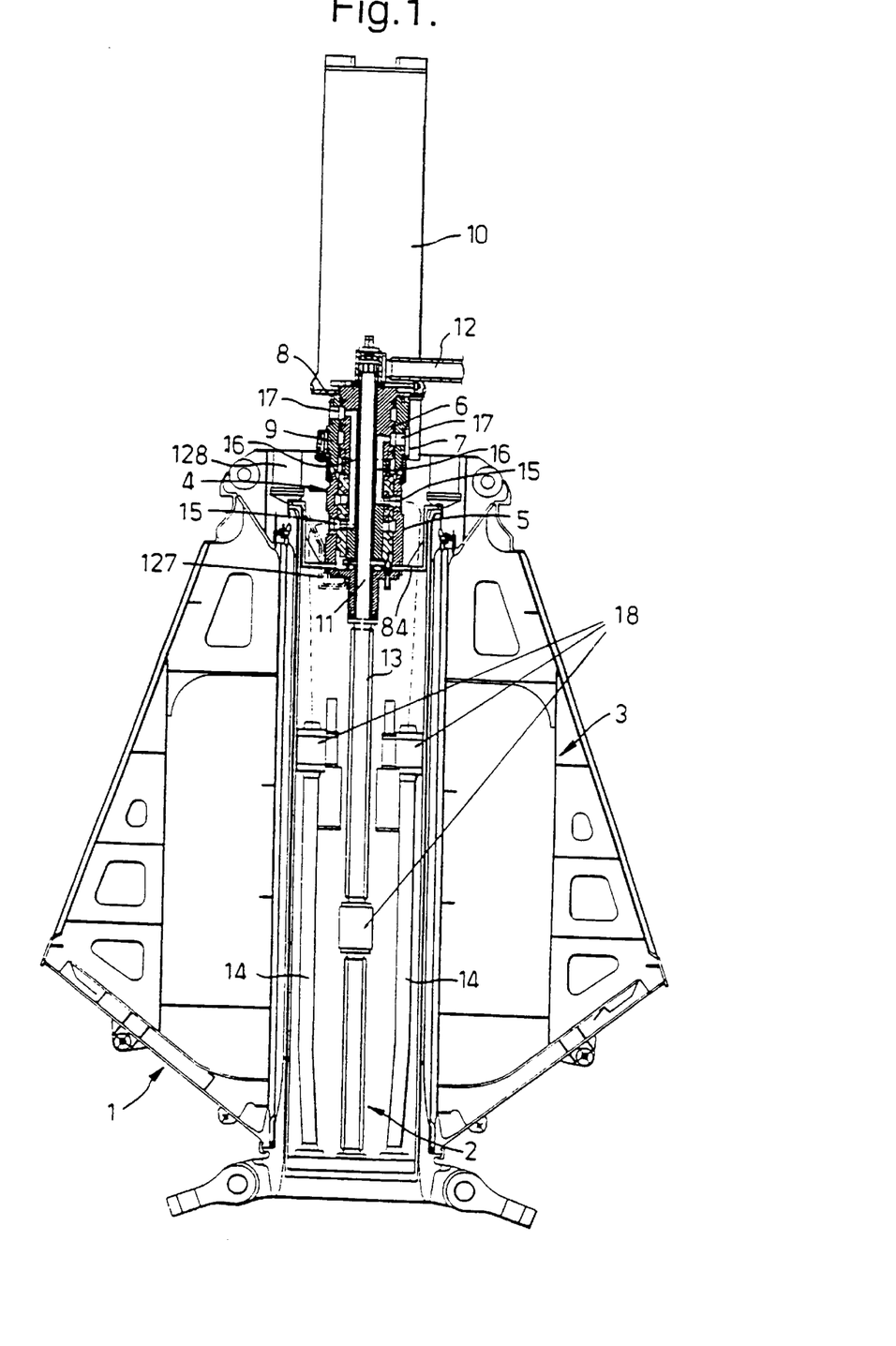
FIG. 1 shows an axial longitudinal section through a buoy at the upper end of which there is arranged a rotating connector having an integrated LNG course according to the invention.

The buoy 1 shown in FIG. 1 is of the introductorily stated type comprising a bottom-anchored centre member 2 and an outer buoyancy member 3 which is rotatably mounted on the centre member and is intended for introduction and releasable securing in a submerged receiving space (not shown) at the bottom of a floating production vessel. The rotating connector 4, which is arranged at the upper end of the buoy, comprises a pair of cooperating swivel members in the form of a female member 5 which is permanently fixed to the centre member 2 of the buoy, and a male member 6 which may be introduced axially into or withdrawn from the female member by means of an operating means 7. This is in the form of a telescopic hydraulic cylinder which is supported by an annular flange 8. To the annular flange 8 there is fastened a guide sleeve 9 wherein the male swivel member 6 is slidably mounted, as more clearly shown in FIGS. 2, 4 and 6. The annular flange 8 supports a protecting housing 10 receiving the male swivel member 6 when this is pulled up from the female swivel member 5. The protecting housing at its upper end is coupled to a crane (not shown) by means of which the housing 10 together with the transfer sleeve 9 and the male swivel member which is pulled up into the housing, can be removed from the area above the buoy when this is to be pulled into the receiving space in the vessel, or brought into position over the female swivel member when the swivel members are to be interconnected.

In the embodiment of FIG. 1 the rotating connector is provided with an LNG unit according to the embodiment shown in FIG. 6, and which is to be further described with reference to this Figure. As shown, the LNG unit includes an LNG course 11 extending centrally through the male swivel member 6 and forming a flow connection between an LNG line 12 on the vessel and a transfer line 13 through the centre member 2 of the buoy. Through the centre member of the buoy there also extend a pair of transfer pipes 14 which, at their upper ends, are connected to respective annuluses 15 which are defined between the female swivel member 5 and the male swivel member 6 and which, via associated fluid courses 16 and annuluses 17 in the male swivel member, communicates with a pipe system (not shown) on the topical vessel. One of the transfer pipes will be intended for transfer of process fluid, and the other for injection fluid. As will be clear, the transfer pipe 14 and the transfer line 13 will be connected to respective risers (not shown) which are connected to the buoy. Both the transfer line and the transfer pipes are provided with riser isolation valves 18.

Before the LNG unit according the invention is further described, there will, for the sake of survey, first be given a short description of the other main components of the rotating connector.

Figure 2:
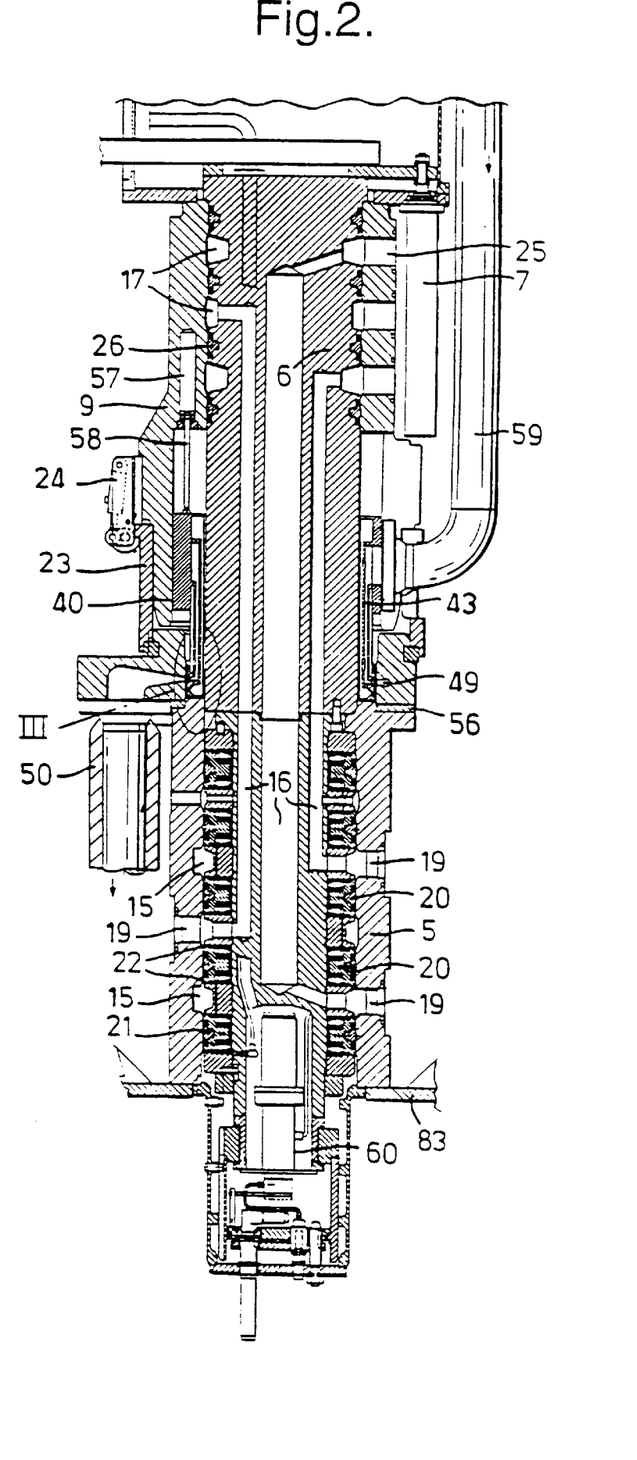
FIG. 2 shows an axial longitudinal section through a rotating connector having an LNG unit according to a first embodiment of the invention.
Figure 4:
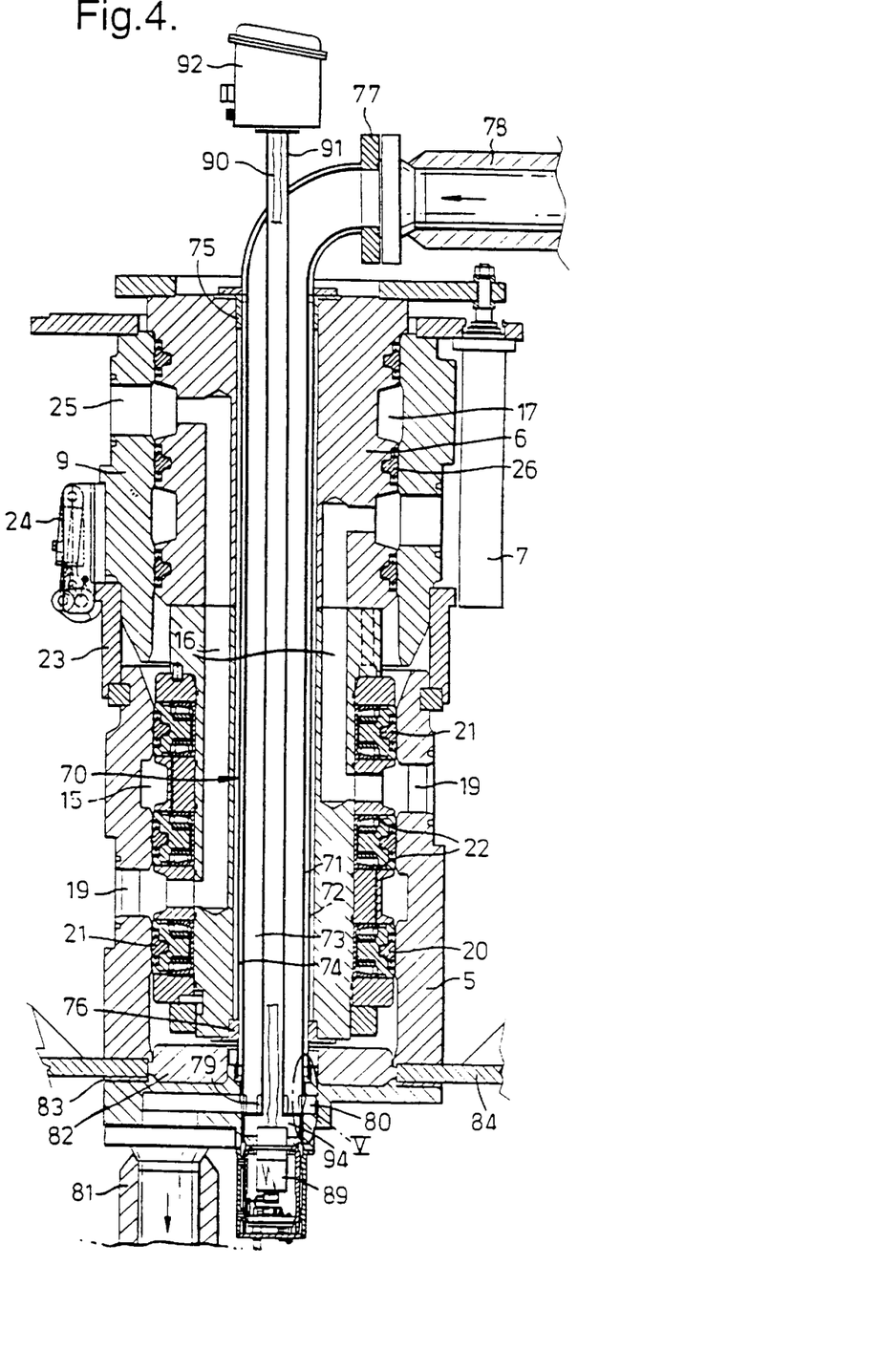
FIG. 4 shows an axial longitudinal section through a rotating connector having an LNG unit according to a second embodiment of the invention.

As mentioned above, a number of annuluses 15 are defined between the female swivel member 5 and the male swivel member 6. In the embodiment of FIG. 2 there are arranged four such annuluses 15, whereas the embodiments of FIGS. 4 and 6 are restricted to two annuluses. The annuluses communicate with respective fluid courses 19 in the female swivel member 5, and with respective ones of the above-mentioned fluid courses 16 in the male swivel member 6. All fluid courses and annuluses will be arranged in accordance with the need in the topical operational case.

On each side of each of the annuluses 15 the male swivel member is provided with a peripheral annular groove receiving a radially movable ring element 20 having a static sealing means 21 for static sealing against the female swivel member, and with dynamic sealing means 22 for sealing between the ring element 20 and the side walls of the annular groove. As mentioned in the introduction, the sealing means may be operated hydraulically by means of a barrier liquid having a higher pressure than the process fluid pressure. For a further description of the constructive design and manner of operation of this arrangement reference is made to the introductorily mentioned patent application No. 932460.

As mentioned above, the male swivel member 6 is slidably mounted in a guide sleeve 9. The female swivel member 5 at its upper end is provided with a rotatably mounted holding ring 23, and the lower end of the guide sleeve 9 is tapering and adapted for introduction into the holding ring 23. When the male swivel member is to be introduced into the female swivel member, the protecting housing 10 and the guide sleeve 9 are firstly lowered in roughly centred position above the female member, so that the guide sleeve is introduced to an abutment position in the holding ring 23. Thereafter the guide sleeve is locked to the holding ring by locking means consisting of hydraulic locking cylinders 7 fastened to the outer side of the guide sleeve. In this manner an accurate positioning of the swivel members relative to each other is secured, so that the male swivel member may be introduced and withdrawn in a safe and controlled manner.

It is to be remarked that the fluid courses 16, via the annuluses 17 and associated passages 25 through the guide sleeve 9, are connected to said pipe system on the vessel via flexible hoses (not shown), to permit the movements of the guide sleeve in connection with the above-mentioned manipulation of the male swivel member. Further, it is to be noted that on each side of the annuluses 17 there are arranged hydraulically operated seals 26 for static sealing between the male swivel member 6 and the guide sleeve 9 when the male member is moved in place in the female member.

A first embodiment of the LNG unit according to the invention is shown in FIG. 2. The unit here is integrated in a standard embodiment of a rotating connector and is arranged as a separate ring element 40 outside the male swivel member 6. The ring element 40 includes a pair of central cylindrical walls 41, 42 (see the enlarged view in FIG. 3) defining an annulus course or annular volume 43 for LNG, and a cofferdam means for insulation of the annular volume on each side thereof. The cofferdam means consists of an inner cofferdam wall 44 which, together with the inner wall 41, define an insulation space 45 between the LNG course 43 and the male swivel member 6, and an outer cofferdam wall 46 which, together with the outer wall 42, define an insulation space 47 between the LNG course and the female swivel member 5.

Figure 3:
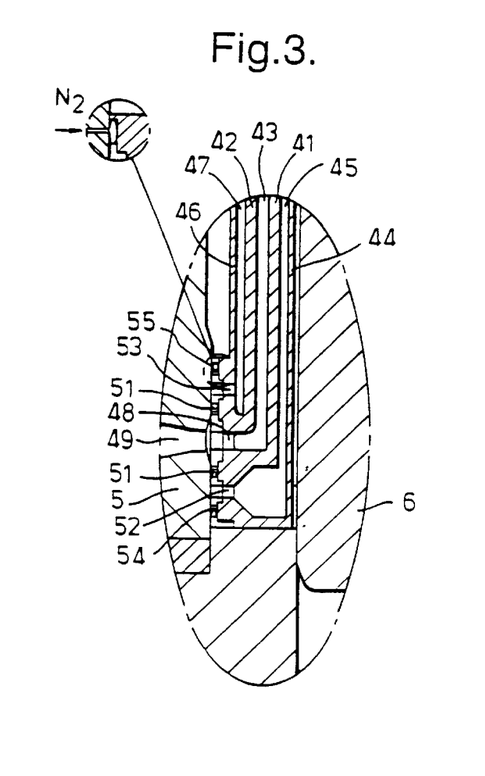
FIG. 3 shows the detail III in FIG. 2 on an enlarged scale.

As shown in FIG. 3, the LNG course 43 at its lower end has an outlet 48 in the form of a possibly peripheral annular opening which, via an annulus 49 between the male and female swivel members, communicates with the insulating transfer line 50 (corresponds to the line 13 in FIG. 1) through the buoy. The LNG outlet 48 is sealed against the female swivel member by means of dynamic seals 51 on each side of the outlet.

Such as further appears from FIG. 3, the annuluses 45, 47 of the cofferdam means at their lower end are open towards the surroundings via peripheral annuluses 52 and 53, respectively. These annuluses in operation is sealed against the surroundings by means of dynamic seals 54 and 55, respectively. In addition to providing for sealing of the insulation spaces, these seals also provide for control of a possible LNG leakage via the LNG seals 51 between the LNG course 43 and its connection with the transfer line 50 through the buoy.

For additional insulation of the LNG course, a ceramic insulation ring 56 is arranged between an upper and a lower part of the female swivel member 5, as shown in FIG. 2.

In the shown embodiment the ring element or LNG unit 40 is axially displaceable on the male swivel member 6 and is connected to an operating means in order to be introduced to its operating position within the female swivel member 5 after that the male swivel member is connected to the female swivel member. As shown, the operating means consists of a hydraulic cylinder/piston unit 57 which is arranged in the guide sleeve 9 and is coupled to the LNG unit via a piston rod 58.

The annuluses 45 and 47 of the cofferdam means may either be put under a vacuum or be pressurized with $N_2$ (with a pressure which is higher than the LNG pressure). In the illustrated embodiments a vacuum is used in the insulation spaces. As mentioned in the introduction, this presupposes the use of a vacuum pump for maintenance of the necessary underpressure. This pump and the necessary conduit connections and couplings for this purpose are not shown in the drawings for the sake of clarity. The seals 54, 55 against the surroundings (atmosphere/sea) in FIG. 3 are shown as single seals (spring-loaded Teflon seals). Alternatively, the seals may be executed as double lip seals having an $N_2$ overpressure between the sealing elements, as shown in the encircled detail in FIG. 3.

The shown dynamic seals on the ring element 40 must be able to take axial as well as rotating movement. The seals are shown to be arranged on the same diameter. They may, however, be arranged on different diameters, if one wants to reduce the axial travel of the seals while they are resting against the female swivel member, to a minimum.

In the illustrated embodiment, a flexible hose 59 for LNG transfer is fixed directly to the LNG course 43 at the upper end of the ring element 40, and the guide sleeve 9 and the holding ring 23 are provided with respective axial slots for allowing the topical movements of the ring element and the hose. There is therefore a need for dynamic seals only on the lower part of the ring element. An alternative solution might be to have dynamic seals at both ends of the ring element. The upper and lower ends of the ring element then become equal, and the LNG inlet goes via the guide sleeve where the flexible hose is fastened.

In the standard embodiment of the rotating connector shown in FIG. 2 an electro-hydraulic swivel 60 is arranged at the lower end of the device. This swivel is arranged for the transfer of electrical power and electrical and hydraulic control signals between the vessel and the topical subsea installation. The swivel is of a known and commercially available type, and the lines from the swivel are connected to corresponding lines in the buoy via a coupling arrangement which is also of a known type. This arrangement is not of importance for the understanding of the present invention, and therefore will not be further described.

A rotating connector having a second embodiment of an LNG unit according to the invention is shown in FIG. 4. In this embodiment the LNG unit 70 is a concentric pipe arrangement which is placed in a central axial passage through the male swivel member 6. For this reason the rotating connector has a somewhat larger diameter than the device according to FIG. 2, but in other respects it will be similar and have the same functions as previously.

The pipe arrangement consists of an inner pipe 71 and an outer pipe 72, where the inner pipe forms a pipe course 73 for LNG and the outer pipe constitutes a cofferdam wall which, together with the inner pipe, define an insulating annulus 74 between the LNG course and the male swivel member 6. The outer pipe 72 is rigidly fastened to the male swivel member 6 via thermally insulating guides 75 and 76, respectively, at the upper and lower ends of the swivel member. The pipe arrangement thus follows the movements of the male member. Further, the pipe arrangement is connected, via an upper 90 degrees bend portion and a flange connection 77, to an insulating line 78 for the supply of LNG to the pipe course 73.

At its lower end the inner pipe 71 has a number of outlet openings 79 which, via an opposite annulus 80 in the lower part of the female swivel member 5, communicate with the insulated transfer line 81 through the buoy. Over the lower part of the female swivel member there is arranged an insulation 82 against the male swivel member 6, and said lower part further is connected to the overlying part of the female swivel member via a ceramic insulating ring 83 and a fastening flange 84 which is fastened to the centre member of the buoy, as appears from FIG. 1.

Figure 5:
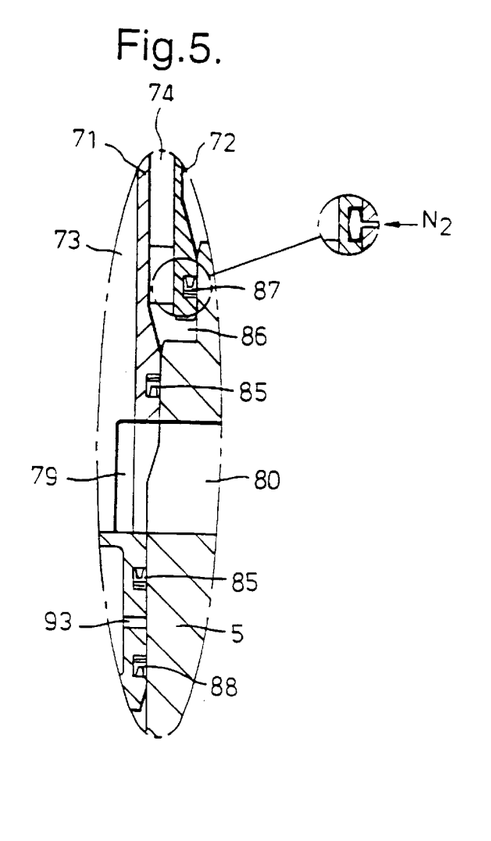
FIG. 5 shows the detail V in FIG. 4 on an enlarged scale.

As shown in the enlarged view of FIG. 5, the outlet openings 79 of the LNG course are sealed against the lower part of the female swivel member 5 by means of dynamic seals 85 on each side of the openings. The annulus 74 of the cofferdam means is open towards the surroundings via an annular opening 86, and this opening in operation is sealed against the surroundings by means of a dynamic seal 87. As in the first embodiment, this seal also provides for control of a possible LNG leakage via the upper LNG seal 85. A corresponding seal 88 is also arranged on the outside of the lower LNG seal 85.

The annulus 74 may either be put under a vacuum or pressurized with $N_2$. Similarly to the first embodiment, a vacuum is presupposed to be used, but the necessary vacuum pump and associated line connections for the sake of clarity are not shown. The seals 87, 88 against the surroundings are shown as single seals, but alternatively these may be carried out as double seals having an $N_2$ overpressure, as shown in the encircled detail in FIG. 5. Since the LNG unit 70 follows the movements of the male swivel member, the sealing means will enter their respective sealing surfaces in the lower, part of the female swivel member during the final phase of the interconnection. As in the first embodiment, the sealing means must take both axial and rotating movement.

An electrohydraulic swivel 89 of a similar type as in the first embodiment is placed centrally under the concentric pipes 71, 72. The swivel arrangement in this embodiment will have a limited diameter, since it has to pass the LNG sealing zone, and therefore it will only be able to transfer electrical and hydraulic control signals. The electrical lines and the hydraulic hoses 90 for connection with the swivel 89 are passed through a pipe 91 which extends centrally through the inner pipe 71 and at its upper end supports an electrohydraulic connection box 92. The pipe 91 suitably is placed under a vacuum to obtain a sufficient insulation for the hydraulic hoses 90. When the pipe 91 is placed under a vacuum, it will, in addition to said insulation, also provide a vacuum for the lower seal 85 and the seal 88.

As shown in FIG. 5, radial ports 93 (only one is shown in FIG. 5) are arranged through the inner pipe 71 at its lower end between the seals 85 and 88. These ports will lead a possible LNG leakage via the lower LNG seal 85 into a chamber 94 communicating with the pipe 91 and thus being under a vacuum, so that also LNG leakage via said seal will be able to be directed via the vacuum pump to burning-off in the flare boom of the vessel, as mentioned in the introduction.

Figure 6:
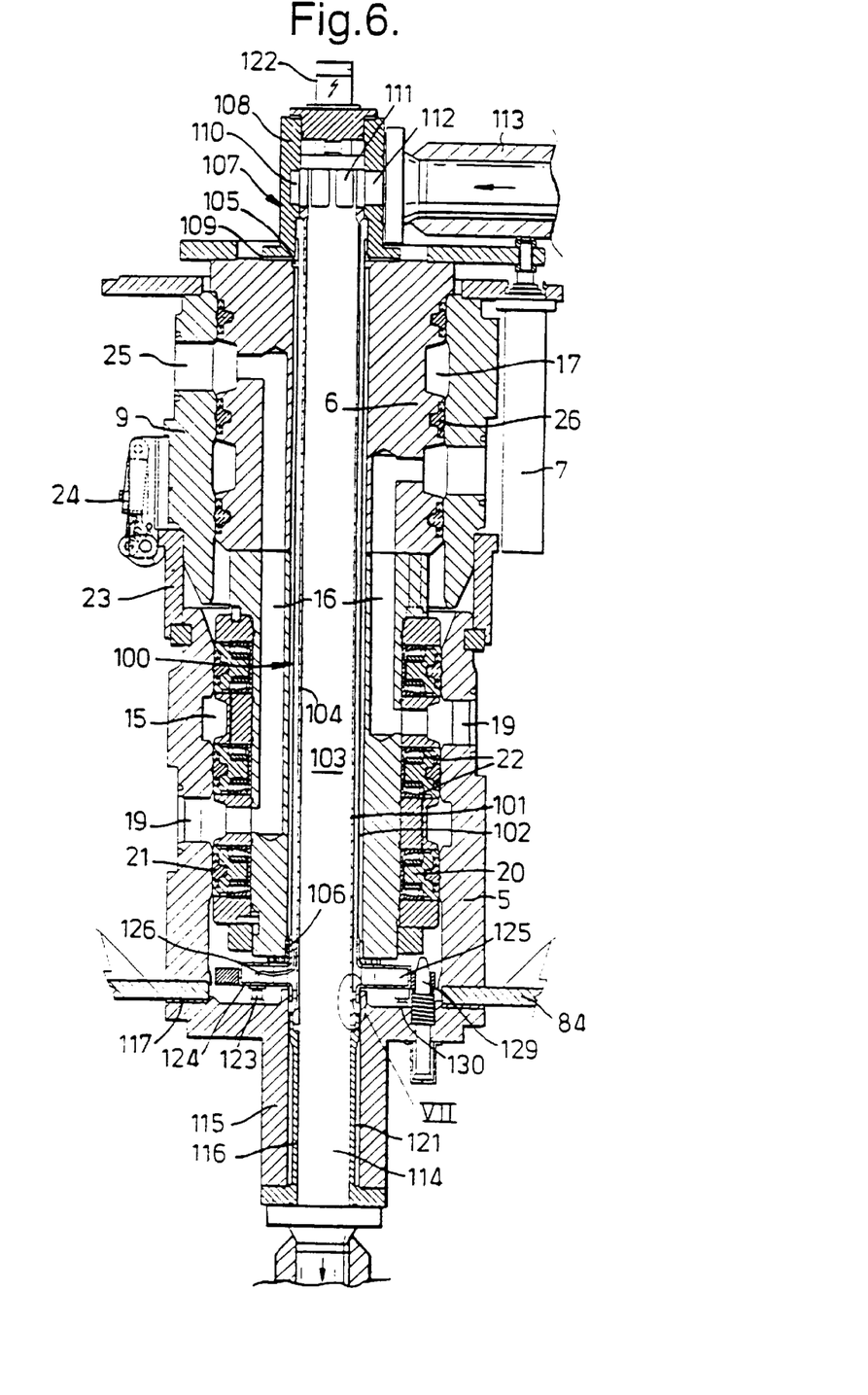
FIG. 6 shows an axial longitudinal section through a rotating connector having an LNG unit according a third embodiment of the invention.

A rotating connector having a third embodiment of an LNG unit according to the invention is shown in FIG. 6. This embodiment is identical with the embodiment shown in connection with the buoy in FIG. 1. The rotating connector corresponds to the device in FIG. 4, apart from the arrangement in the lower part. The LNG unit 100 also resembles the LNG unit 70 in FIG. 4, as it consists of a concentric pipe arrangement which is placed in a central axial passage through the male swivel member 6. However, in this embodiment the pipe arrangement is rotatable relative to the male swivel member during operation.

The pipe arrangement consists of an inner pipe 101 and an outer pipe 102, where the inner pipe forms a pipe course 103 for LNG and the outer pipe constitutes a cofferdam wall which, together with the inner pipe, define an insulating annulus 104 between the LNG course and the male swivel member 6. The outer pipe 102 is journalled in relation to the male swivel member by means of an upper roller bearing 105 and a lower slide bearing 106.

An LNG swivel 107 is placed at the top of the male swivel member 6 and comprises an outer housing member 108 which is fastened to the male swivel member via an intermediate ceramic ring 109 for thermal insulation. The housing member 108 has an annulus 110 forming a flow connection between a number of upper openings 111 in the inner pipe 101 and a passage 112 leading to an insulated flexible hose 113 for the supply of LNG. At the upper ends of the pipes 101 and 102 there are arranged seals (not more closely shown) bearing against the adjacent inner wall of the housing member 108.

The inner pipe 101, forming the LNG course 103, at its lower end passes into an axially directed passage 114 through a pipe-shaped extension member 115 of the lower part of the female swivel member 5. The passage is defined by a sleeve member 116 which is inserted into the extension member 115 and which, at its lower end, is connected to the LNG transfer line 13 through the buoy. The lower part of the female swivel member 5 is fastened to the overlying part via a ceramic insulating ring 117 and the fastening flange 84 which is fastened to the centre member of the buoy, as shown in FIG. 1.

Figure 7:
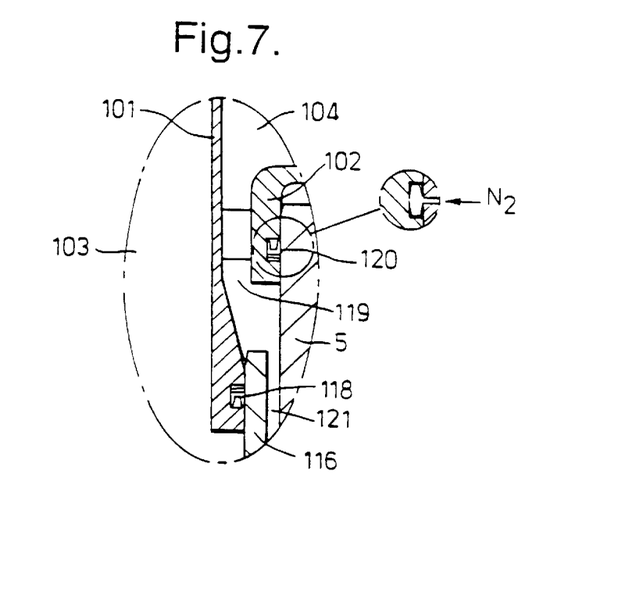
FIG. 7 shows the detail VII in FIG. 6 on an enlarged scale.

As shown in the enlarged view of FIG. 7, the LNG course 103 is sealed against the female swivel member 5, or more specifically against the upper end of the sleeve member 116, by means of a seal 118. The annulus 104 of the cofferdam means is open towards the surroundings via an annular opening 119, and this opening in operation is sealed against the surroundings by means of a seal 120. As in the preceding embodiments, this seal also provides for control of a possible LNG leakage via the LNG seal 118.

The annulus 104 may either be placed under a vacuum or pressurized with $N_2$. As in the preceding embodiments, a vacuum is presupposed to be used. The seal 120 against the surroundings also here is shown as a single seal, but alternatively may be executed as a double seal with an $N_2$ overpressure, as shown in the encircled detail in FIG. 7. The seals in this embodiment will see only axial movement, more specifically during the interconnection, whereas they are static during operation, the LNG unit then being locked to the female swivel member, but is rotatable relative to the male swivel member by means of the LNG swivel.

As appears from FIGS. 6 and 7, an annulus 121 is formed between the extension member 115 and the sleeve member 116, which annulus constitutes a continuation of the cofferdam annulus 104. Thereby an extension of the effective insulation is obtained downwards in the buoy, so that the number of thermal bridges is reduced.

In the embodiment according to FIG. 6 an electrohydraulic swivel 122 is placed on the top of the LNG swivel 107. This placing is advantageous since it gives a better accessibility to the swivel than in the preceding embodiments, and thereby a more flexible arrangement and better space, so that the swivel may be adapted for transfer of a high electrical power, or generally easily may be adapted to the topical customer-specific needs.

The electrical and hydraulic couplings 123 for interconnection of the lines or conduits from the swivel 122 with corresponding lines in the buoy are arranged on a radially projecting flange member 124 of the cofferdam means at the bottom of the female swivel member 5. As shown in FIG. 6, the flange member is constituted by the lower part of a radially projecting portion of the cofferdam pipe 102, this portion forming a radially projecting space 125 communicating with the cofferdam annulus 104. The lines 126 between the swivel 122 and the couplings 123 extend through the annulus 104 and the radial space 125.

As suggested with dashed lines in FIG. 1, the lines 127 from the couplings 123 are carried up to a control module 128 which is arranged at the top of the buoy 1, the corresponding lines (not shown), which form part of the usual umbilical which extends through the buoy and down to the topical subsea installation, being connected to this module.

In order to ensure that the electrical and hydraulic couplings 123 on the flange member 122 will hit their respective counterparts at the bottom of the female swivel member, the LNG unit 100 must rotate during the interconnection. This may for example be done by means of a small electric or hydraulic motor (not shown) which is arranged to rotate the LNG unit slowly during the whole interconnection. As shown, a strong locating bolt 129 is arranged at the bottom of the female swivel member, to stop the rotation when the unit has arrived in the correct position. The locating bolt is spring-loaded, so that it shall not be necessary to stop the installation procedure in order to find the correct position. Fine positioning is achieved by means of smaller locating bolts 130 just before interconnection of the connectors. Said driving motor, which suitably may be placed at the top of the LNG swivel, must be able to be locked against rotation without being damaged.

We claim:

1. A rotating connector comprising a swivel device (5, 6) with a number of fluid courses (16) for interconnection between a buoy (1) and a pipe system on a floating vessel for the production of hydrocarbons, wherein the swivel device comprises a female member (5) and a male member (6) which may be introduced axially into or withdrawn from each other, the female member (5) being permanently fixed to a bottom-anchored centre member (2) of the buoy (1), characterized in that one of the fluid courses is arranged for transferring liquefied natural gas (LNG) between the vessel and a transfer line (13) through the buoy (1), and for this purpose is thermally and physically separated from the other courses (16), the LNG course being a pipe course or an annular course (73; 103 or 43) in a separate unit (70; 100; 40) placed centrally within or surrounding the male swivel member (6), the unit comprising an insulating cofferdam means having an annulus (74; 104; 45) for insulation between the LNG course (73; 103; 43) and the male swivel member (6), and an additional annulus (47) for insulation between the LNG course (43) and the female swivel member (5) when the unit (40) surrounds the male swivel member (6), the annulus (74; 104) or annuluses (45, 47) at least at one end being open towards the surroundings via a peripheral annular opening (86; 119 or 52, 53) which in operation is sealed against the surroundings by sealing means (87, 88; 120; 54, 55) for control of a possible LNG leakage via LNG seals (85; 118; 51) between the LNG course (73; 103; 43) and its connection with the transfer line (81; 13; 50) through the buoy.

2. A rotating connector according to claim 1, characterized in that the annulus (74; 104; 45, 47) of the cofferdam means communicates with a pump for the provision of an insulating vacuum in the annulus (74; 104) or annuluses (45, 47).

3. A rotating connector according to claim 1, characterized in that the annulus (74; 104; 45, 47) of the cofferdam means communicates with a gas source in order to be pressurized with an insulating gas, preferably nitrogen, having a pressure which is higher than the LNG pressure.

4. A rotating connector according to claim 1, characterized in that the sealing means between the annulus (74; 104) or annuluses (45, 47) and the surroundings are double seals which are arranged to be pressurized with an overpressure gas.

5. A rotating connector according to claim 1, wherein the separate unit (40) surrounds the male swivel member (6), characterized in that the LNG course (43) has an outlet (48) which communicates with the transfer line (50) through the buoy via an opposite annulus (49) between the male and female swivel members (6, 5), and which is sealed against the female swivel member (5) by means of seals (51) on each side of the outlet (48), the annular openings (52, 53) of the cofferdam annuluses (45, 47) with their associated sealing means (54, 55) being located on respective outer sides of the LNG seals (51).

6. A rotating connector according to claim 5, characterized in that the separate unit (40) is axially displaceable on the male swivel member (6) and is coupled to a hydraulic operating means (57) to be introduced to its operating position in the female swivel member (5) after that the male swivel member is interconnected with the female swivel member.

7. A rotating connector according to claim 5, characterized in that the inlet of the LNG course (43) at the upper end of the unit (40) communicates with a flexible hose (59) which is fastened directly to the inlet.

8. A rotating connector according to claim 1, wherein the separate unit (70) is placed centrally within the male swivel member (6), characterized in that the unit (70) is a concentric pipe arrangement (71, 72) extending through and following the movements of the male swivel member (6), the LNG course (73) at its lower end having outlet openings (79) communicating with the transfer line (81) through the buoy via an opposite annulus (80) in the female swivel member (5), and which are sealed against the female swivel member by means of seals (85) on each side of the outlet openings (79), the annular opening (86) of the cofferdam annulus (74) with its associated sealing means (87) being located on the upper side of the upper LNG seal (85).

9. A rotating connector according to claim 8, characterized in that an electrohydraulic swivel (89) for the transfer of electrical and hydraulic control signals is arranged at the lower end of the pipe arrangement (71, 72), and that electrical and hydraulic lines (90) for connection with the swivel (89) are carried through a pipe (91) extending centrally through the pipe arrangement (71, 72).

10. A rotating connector according to claim 9, characterized in that the pipe (91) is placed under a vacuum, for insulation of the hydraulic lines (90) extending through the pipe.

11. A rotating connector according to claim 1, where the separate unit (100) is placed centrally within the male swivel member (6), characterized in that the unit (100) is a concentric pipe arrangement (101, 102) extending through the male swivel member (6) and being rotatably arranged relative thereto, an LNG swivel (107) being arranged at the upper end of the pipe arrangement, and that the LNG course (103) at the lower end has an outlet communicated with the transfer line (13) through the buoy (1) via an axially directed passage (114) through the female swivel member (5), and which is sealed against the female swivel member (5) by means of a peripheral seal (118), the annular opening (119) of the cofferdam annulus (104) with its associated sealing means (120) being located on the upper side of the LNG seal (118).

12. A rotating connector according to claim 11, characterized in that an electrohydraulic swivel (122) for the transfer of at least electrical and hydraulic control signals is arranged on the top of the LNG swivel (107), and that couplings (123) for interconnection of respective electrical and hydraulic lines (126) from the swivel (122) and from the buoy (1) are arranged on a radially projecting flange member (124) of the cofferdam means (102) below the male swivel member (6), the electrical and hydraulic lines (126) between the swivel (122) and the couplings (123) extending through the annulus (104) of the cofferdam means (13).

13. A rotating connector according to claim 12, characterized in that it includes a motor which is arranged to rotate the LNG unit (100) slowly during interconnection of the male swivel member (6) and the female swivel member (5), for correct interconnection of said couplings (123) with corresponding couplings on the female swivel member (5).

* * * * *